(12) United States Patent
Quick

(10) Patent No.: US 6,748,400 B2
(45) Date of Patent: Jun. 8, 2004

(54) DATA ACCESS SYSTEM AND METHOD

(76) Inventor: David F. Quick, 16026 Santa Cathrena, San Antonio, TX (US) 78232

( * ) Notice: Subject to any disclaimer, the term of this patent is extended or adjusted under 35 U.S.C. 154(b) by 215 days.

(21) Appl. No.: 09/887,378

(22) Filed: Jun. 22, 2001

(65) Prior Publication Data

US 2001/0056435 A1 Dec. 27, 2001

Related U.S. Application Data

(60) Provisional application No. 60/213,404, filed on Jun. 22, 2000.

(51) Int. Cl.[7] .............................................. G06F 17/00
(52) U.S. Cl. ...................... 707/104.1; 707/10; 707/102; 713/193
(58) Field of Search ........................ 707/1–206; 705/28, 705/78; 713/193–194

(56) References Cited

U.S. PATENT DOCUMENTS

| | | | |
|---|---|---|---|
| 5,664,112 A | 9/1997 | Sturgeon et al. ............... 705/28 |
| 5,724,255 A | 3/1998 | Smith et al. ................. 364/500 |
| 5,726,884 A | 3/1998 | Sturgeon et al. ............ 395/209 |
| 5,815,417 A | 9/1998 | Orr et al. ..................... 364/578 |
| 6,578,043 B2 * | 6/2003 | Nye ............................ 707/102 |
| 6,658,568 B1 * | 12/2003 | Ginter et al. ................. 707/10 |
| 6,675,164 B2 * | 1/2004 | Kamath et al. ................. 707/6 |

OTHER PUBLICATIONS

Nembhard et al., Heuristic path selection in OR–graphs with application to HAZMAT routing, Systems, Man, and Cybernetics, 1994, Humans, Information and Technology, 1994 IEEE International Conference on, vol. 2, Oct. 2–5, 1994, pp. 1536–1540, vol. 2.*

Huang et al., GIS_AHP model for HAZMAT routing with security considerations, Intelligent Transportation Systems, 2003, Proceedings, 2003, IEEE vol. 2, Oct. 12–15, 2003, pp. 1644–1649.*

GNOME: NOAA's next–generation spill trajectory model, Beegle–Krause, OCEANS '99 MTS?IEEE, Riding the Crest into the 21s Century, vol. 3, Sep. 13–16, 1999, pp. 1262–1266, vol. 3.*

* cited by examiner

*Primary Examiner*—David Jung

(57) ABSTRACT

The disclosed system, method, and apparatus accesses a secure database containing information needed for minimizing injury, saving lives, and protecting property. Included in the secure database is information on hazardous materials.

Upon the receipt of a call for help, emergency response personnel use a communication device to obtain sufficient information for the selection of protective clothing and equipment. Further use of the communication device will provide information on the dangers associated with identified hazardous materials.

In an alternate embodiment, the information stored in the secure database includes information on the location of children, the infirm, the elderly, pets or livestock.

In a still further alternate embodiment the information in the secure database is used for the submission of pre-incident information or post-incident reports.

In a still further alternate embodiment, the information in the secure database is used for analysis and discovering correlations or trends associated with the collected data.

2 Claims, 10 Drawing Sheets

DATA ACCESS SYSTEM AND METHOD

This patent application claims the benefit of U.S. Provisional Patent Application Serial No. 60/213,404 filed Jun. 22, 2000.

FIELD

The present invention relates to information collection, management and dissemination systems; more particularly the present invention relates to facilitating the collection, the management, and the dissemination of information needed by emergency response personnel to contain a dangerous situation and/or to minimize loss of life, injury, or the destruction of personal property. Additionally, the information may be disseminated to other parties needing the collected data for planning, analysis, and decision making.

BACKGROUND

In the past several decades, the public has become increasingly aware of the environmental and health risks caused by the inadvertent release of a variety of substances and chemicals. Accordingly, those substances and chemicals which are harmful are generally referred to as hazardous materials by various government agencies such as the EPA, OSHA and the DOT. One estimate reported that hazardous materials are manufactured, used, or stored at some 4.5 million facilities in the United States.

Because of the potential threat to health, safety, and property posed by even the presence of safely contained hazardous materials in a community, federal, state, and local governments have instituted "right-to-know" laws and regulations wherein even the mere presence and location of certain identified hazardous materials must be reported to various federal, state and local government agencies.

Information regarding the presence and location of certain identified hazardous materials is extremely helpful to the following:

i) manufacturers and other commercial entities;
ii) various governmental departments;
iii) fire departments (particularly hazardous material accident response teams);
iv) law enforcement agencies;
v) emergency medical services;
vi) state and local emergency planning organizations;
vii) municipal planners;
viii) various non-governmental risk management organizations (e.g., insurance companies, safety consultants); and
ix) real estate developers.

Not only is this information helpful to the organizations listed above to identify potential dangers, but also this information assures that local governments have the necessary protective materials in place along with personnel having proper training to respond to crises involving hazardous materials.

A particularly dangerous situation can occur when there is a fire, a spill, or an inadvertent release of a hazardous material at a shop, a factory, a warehouse, a place of business or facility which includes spaces where hazardous materials are stored. The potential for injury is reduced if firemen or emergency response personnel are forewarned of the type and location of hazardous materials which may be burning, leaking, or are in imminent danger of exploding, releasing, or spreading into unprotected areas.

Because of the clear advantages associated with forewarning firemen, other emergency response personnel, and the community at large of the type and location of hazardous materials to be encountered in an emergency situation, many local governments, state governments, and the federal government require every user of hazardous materials to report on the type and location of the hazardous materials on a regular basis, typically once per year. Such hazardous material reports and risk management plans have become known as "Tier I" reports, "Tier II" reports, Risk Management Plans and Business Plans (for the purpose of responding in the event of an emergency). These reports are generally submitted, on paper, to a number of government agencies along with a required filing fee. Paper copies of the filed reports are typically kept by the government agency in a notebook or in a filing cabinet. New or updated reports are required whenever the storage location of hazardous materials is changed or at the expiration of the predetermined reporting periods.

Supplementing the hazardous material reports are the files maintained by local government agencies, typically a fire department, which reports are typically created or updated during a visit or inspection of the facility. These reports called "pre-plans" or "pre-fire surveys" often contain site maps or floor plans and other data that emergency response personnel need to know when responding to an accident at the facility. This information covers, but is not limited to, the following:

i) gas, water, and electrical cut-off locations;
ii) elevator locations;
iii) hydrant and standpipe locations;
iv) hazardous material storage locations;
v) access/egress routes;
vi) risk management plans.

With a "pre-plan" in hand, emergency response personnel can better determine the safer course of action to either access or avoid and area and how to best respond to an incident to save lives, minimize injury, and avoid the destruction of property.

However, information about hazardous materials, once reported, is of no use if it is not made accessible to those who need the information. It has been estimated that some 850,000 "Tier II" reports, in paper form, are prepared submitted annually in the U.S. Those who have the greatest need for the information contained in the hazardous material reports are firemen or emergency response personnel. These firemen and emergency response personnel who must be able to identify and ascertain the location of hazardous materials in a shop, a factory, a warehouse, or in a place of business on the way to a fire or a similar calamity. When emergency response time is short, difficulties are exacerbated. Accordingly, there is a need to provide a system which will provide the reported information as to the nature and reported location of hazardous materials and other site specific information for emergency response personnel on the way to the site of the emergency.

Further complicating the situation is the fact that most firemen and emergency response personnel are not trained chemists or chemical engineers. That is, most firemen do not completely understand all of the hazards associated with the various substances and chemicals that may be stored in a shop, in a factory, in a warehouse, or in a place of business. Specifically, it may not be known if the hazardous material emits toxic fumes when burned or if special fire suppressant materials may be needed. Some hazardous materials may be poisonous or present a significant bio-hazard or have dangerous reactions if exposed to common agents such as water. The type of information can be particularly important when selecting the type of protective clothing chosen by a fireman to provide appropriate or recommended protection at the site of the fire. In some cases, the usual fire retardant clothing may be acceptable, but in other cases, complete containment cover and breathing apparatus may be necessary. Once at the site of the fire or incident, the fireman needs to know how to properly handle the hazardous materials. There is a still further need to supplement information concerning hazardous materials and their reported location with yet additional information concerning the nature of the hazardous materials, details of the response, action taken, personnel involved, and other site-specific information.

Once a fire has been controlled, there may be a need to file an incident report which describes the location of the hazardous materials, conditions encountered, and actions taken. Such incidents can be very complex and oftentimes contain inaccuracies. There is, accordingly, a need to simplify the preparation and submission of post-event incident reports.

While the foregoing has great applicability to situations involving hazardous materials, the same need exists for emergencies occurring in residential dwellings and other structures or locations. Because the needless expenditure of seconds in an emergency situation can mean the difference between life and death, it would be extremely beneficial for emergency response personnel to be able to learn, on the way to a fire or a similar calamity, if an infirm person may be located in an upstairs room, whether or not an infant may be sleeping in a back bedroom, or if animals or pets are located on the premises where a fire may be raging or where some other type of emergency may be occurring.

There is, accordingly, a need to be able to collect, manage and disseminate information to emergency response personnel, in a secure manner, concerning the likely location of people in a dwelling house so that emergency response personnel can go directly to the location where an infirm person and an infant may be sleeping.

SUMMARY

The system, method and apparatus of the present invention enables the collection, management and dissemination of information needed by emergency response personnel to the emergency response personnel at the time when it is most needed—between the receipt of a call for help and the arrival at the scene of the emergency. In addition, the information needed by emergency response personnel may be disseminated either pre-incident or post-incident to facilitate planning, analysis, and decision making with regard to the effective use of resources for both risk avoidance and risk management.

The system, method and apparatus of the present invention is built around a secure database. Access to the information in the secure database is only given to authorized personnel; however, the information contained in the secure database is organized to:

i) increase the effectiveness of emergency response personnel once on the scene of the emergency;

ii) enable emergency response personnel to properly protect themselves against the hazards encountered at the scene of an emergency;

iii) reduce the time necessary to minimize the potential dangers at the scene of an emergency;

iv) visualize the reported location and nature of hazardous materials in the community;

v) discover nuances concerning the stored data and data collected during incidents;

vi) enable emergency response personnel to visualize the effects of a spill or release of hazardous materials;

vii) prevent safety hazards having to do with types, storage locations, proximity to humans, etc. of hazardous materials;

viii) provide the capability to data mine the database to perform risk management, accurately price insurance policies, and to reconcile reported hazardous materials with claims for damages;

ix) provide data to facilitate community planning and zoning activities.

In the preferred embodiment of the invention, the information included in the secure database is from the following categories:

i) information identifying a facility;

ii) information identifying the hazardous materials stored at the facility;

iii) information specifying the location of the hazardous materials stored at the facility;

iv) information describing the chemical properties of the hazardous materials stored at the facility;

v) information concerning facility details, layouts, access/egress routes and other site-related information.

In an alternate embodiment of the invention, the information in the secure database may be the location of a person with infirmities such as an elderly or bedridden person, the location of a child or children, the location of pets or livestock, and other site-specific details such as gas, electric and water cut-offs, as well as designated meeting places determined by the occupants.

When an incident is reported by a fire department, a hazardous material spill response team, emergency medical technicians, or a rescue team gain access to the secure database using a wireless or other communication device. This immediate access to information in the secure database enables the emergency response personnel to review information on the location which has already been reported a variety of public entities, decide the best course of action, outfit themselves with the proper protective clothing and gather the necessary equipment to protect themselves, be most effective at the scene of the emergency, and waste no time addressing the threats to people and property once at the scene of the emergency.

En route to the scene of the emergency, the emergency response personnel can continue to learn about the nature of the situation to be encountered as well as recommended procedures for approaching the danger. Specifically, if there are hazardous materials present, a wireless or other communication device will facilitate learning about the dangers associated with the hazardous materials through publicly available information resources.

The system of the present invention may also be used to assist with the completion of both pre-incident and post-incident administrative tasks.

Because the secure database of the present invention includes all of the necessary information for the completion and filing of required hazardous material reports, the addition of software to extract the stored information and put it in a format usable to satisfy government pre-incident reporting requirements is enabled.

Either during or following an incident, adding information to the secure database about the incident to the information already stored in the secure database, together with software to extract the stored information and put in a format usable to satisfy governmental post-incident reporting requirements, is enabled. Because the secure database of the present invention includes all of the reported information on hazardous materials in the community, the addition of data warehousing and data mining software can analyze the stored data for correlations, observations, and other intelligence not readily available from the current paper reporting environment.

BRIEF DESCRIPTION OF THE DRAWING FIGURES

A better understanding of the system, method and apparatus of the present invention may be had by reference to the drawing figures wherein.

Figures 7A, 7B, 7C:
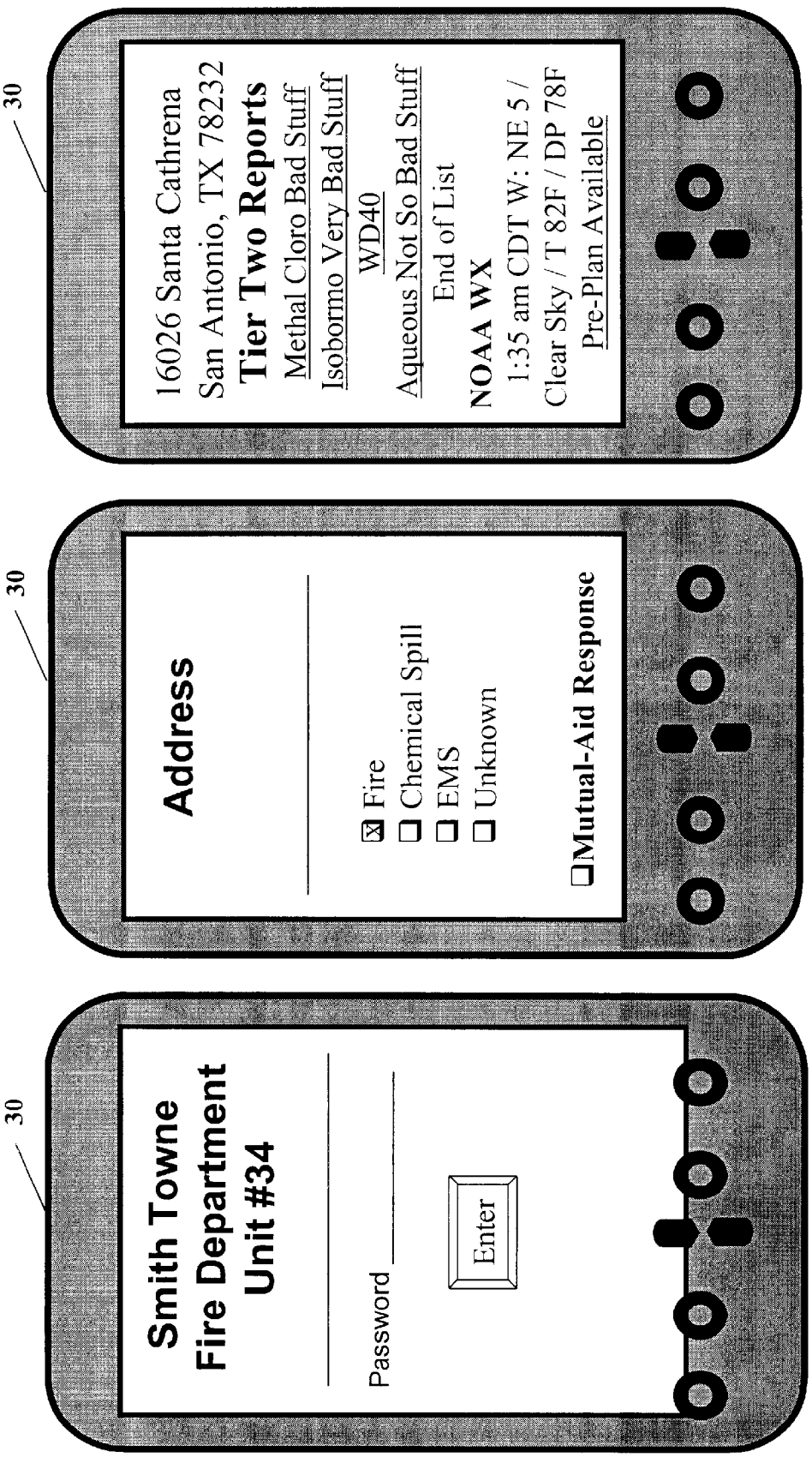
Figure 8:
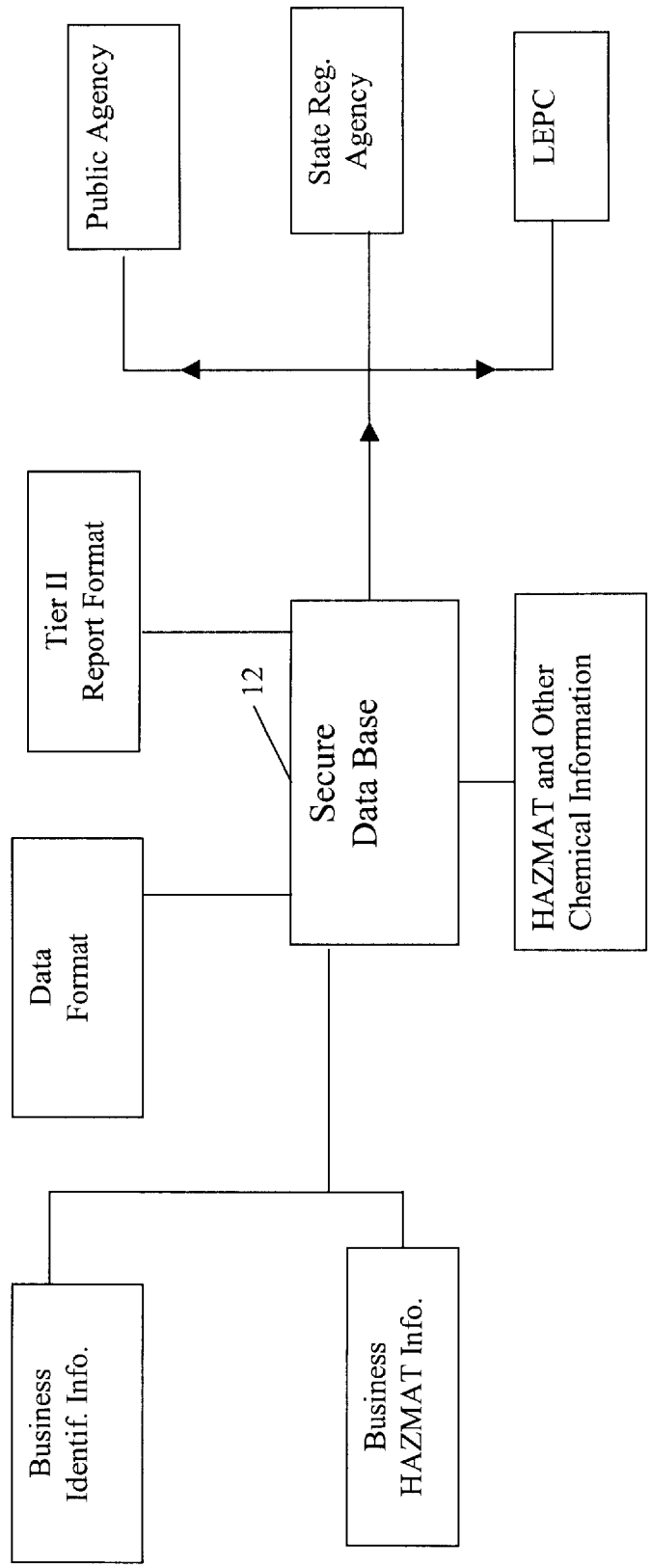

FIGS. 7A, B, C, D, E, and F are exemplary screens available to emergency response personnel on a wireless communication device;

FIG. 8 is a schematic diagram of the report filing process; and

Figure 9:
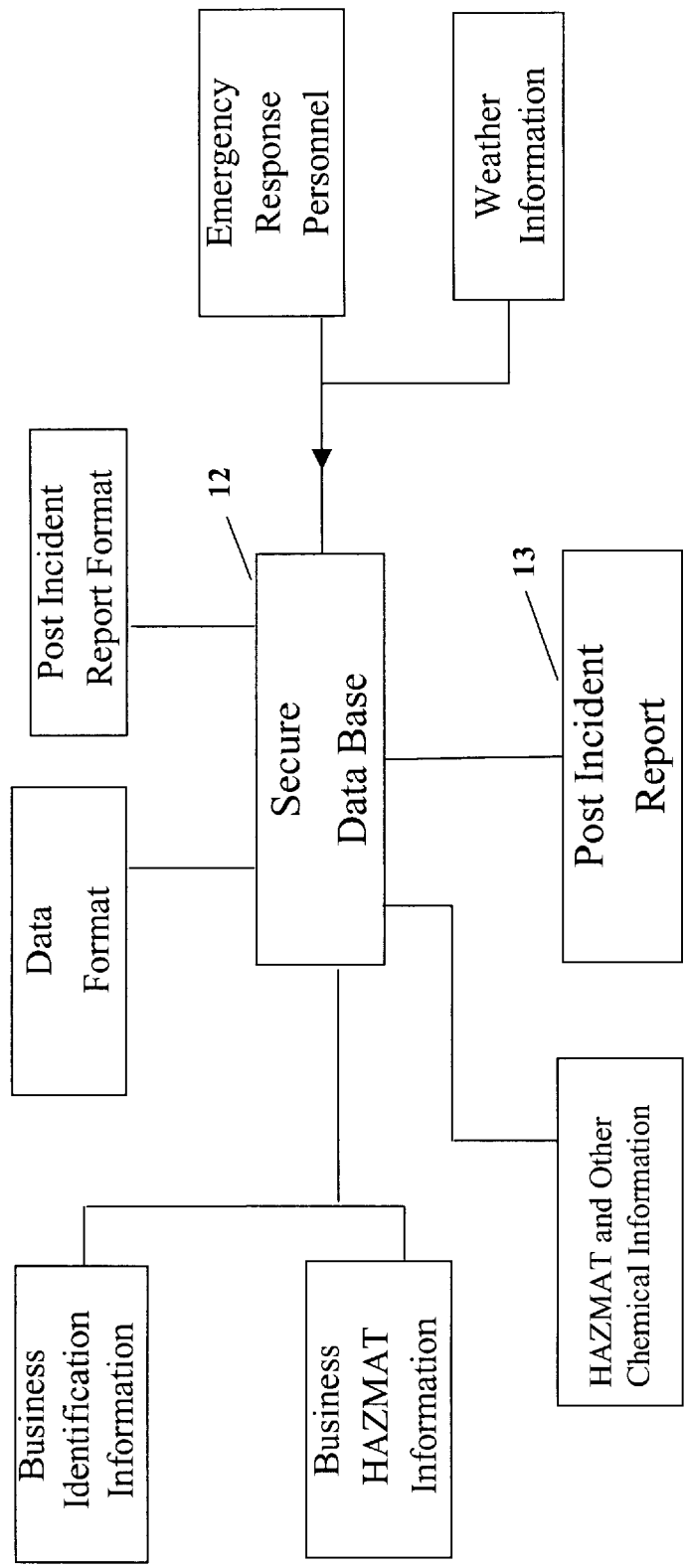

FIG. 9 is a schematic diagram of the post-incident report preparation process.

DETAILED DESCRIPTION OF THE EMBODIMENTS

The system apparatus and method of the present invention 10 is built around a secure database 12. As may be seen in FIG. 1, the secure database 12 includes identification information 14 that may be obtained from a business or other source such as a third party business database. Such information 14 will include business and facility identification information and hazardous materials information 16 with regard to hazardous materials stored at a factory, warehouse, shop, other place of business or facility. Also included within the secure database 12 is information obtained from the pre-incident plan or pre-plan or survey or inspection or visit 18 of the business by a public agency. Typically, this information includes site-plans of the factory, the warehouse, the shop, place of business or facility with the location of the hazardous materials storage and use areas clearly laid out on the site-plan. The secure database 12 is organized according to a prescribed data format 17 so that the information on the business and facility 14, the information on the hazardous materials stored at the business or facility 16, and the information contained in the fire department pre-plan 18 are stored in pre-determined categories. The pre-determined categories are designed to fall in line with those categories that are often found in government reports such as Tier I reports, Tier II reports, Risk Management Plans, Business Plans (for a HAZMAT incident response) or a chemical release report known as Form R. Also contained within the secure database 12 is information on hazardous materials 20. This information may be obtained from a variety of lookup resources to include but not limited to the Coast Guard's CHRIS Manual, the publicly available CAMEO database, the annual edition of the DOT Emergency Response Guidebook, the Center for Disease Control Immediate Danger to Life and Health database, and the Material Specification Data Sheet database. By the use of data warehousing and/or data mining software, the information in the secure database 12 can be re-organized and sorted in a variety of different ways to provide risk analysis information heretofore unavailable from other sources.

Figure 6:
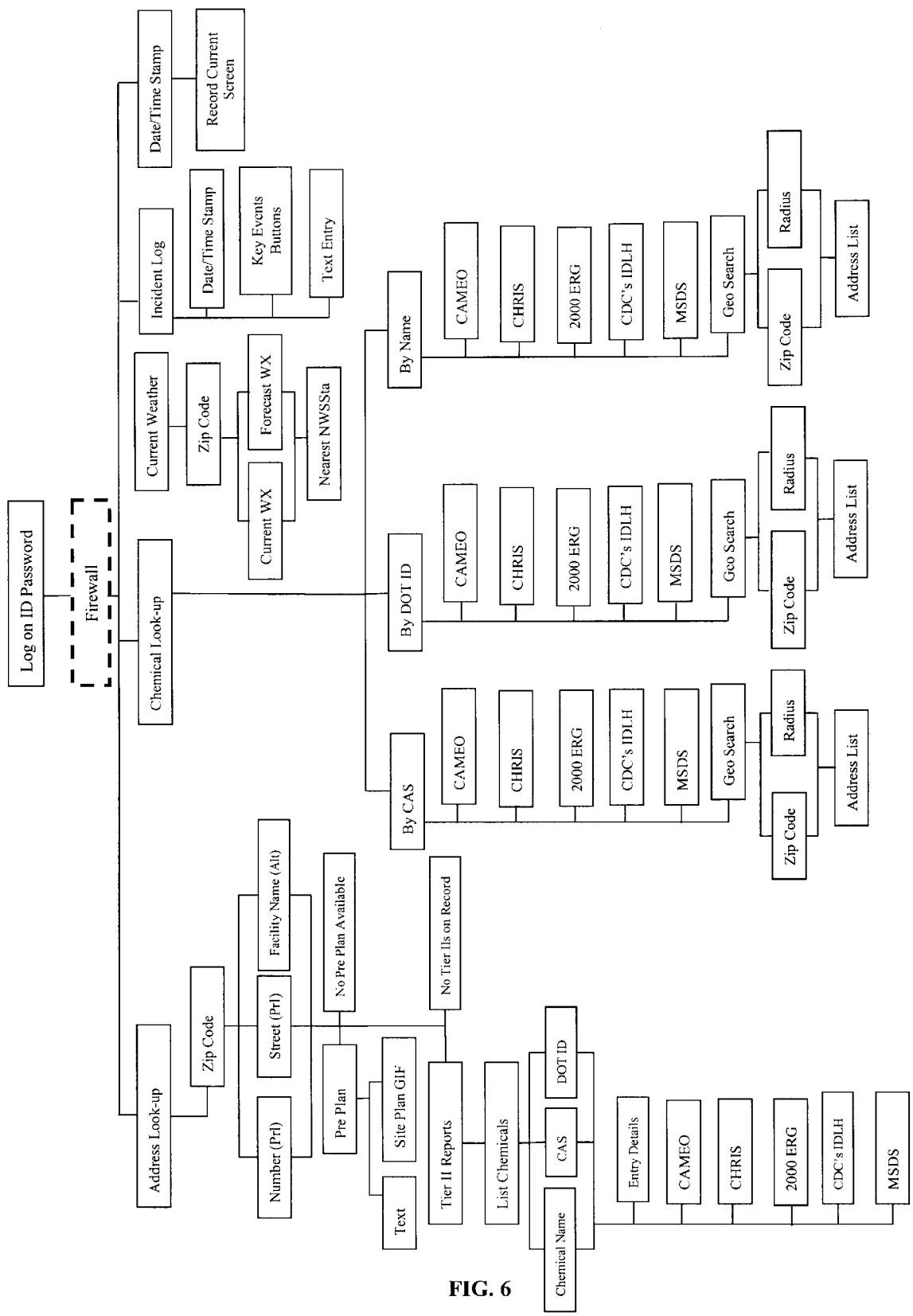
FIG. 6 is a flowchart describing the field query process.
Figure 7F:
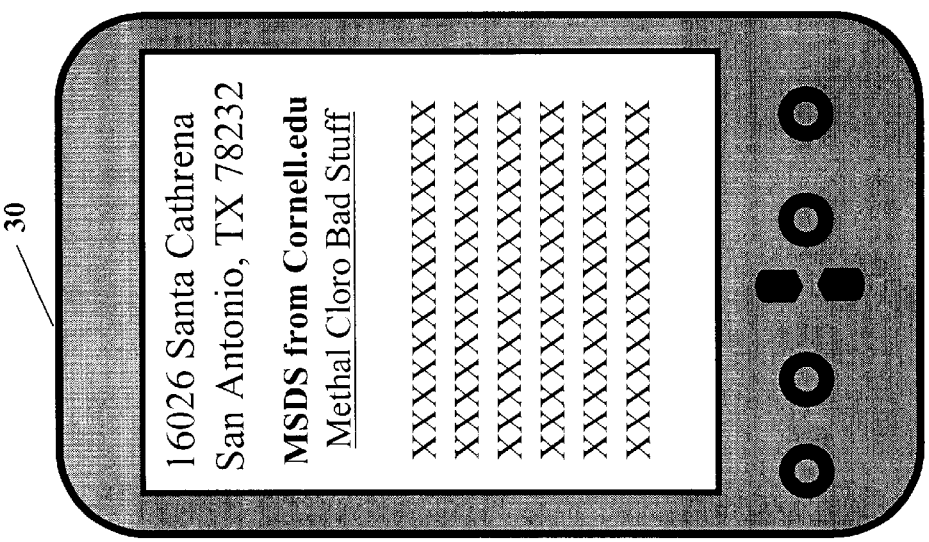

With all this information stored in the secure database 12, the secure database 12 is now ready for utilization by emergency personnel 21 following the receipt of a call for help and arrival at the site of the emergency. To enable access to the secure database of information 12, emergency personnel are required to comply with a security protocol to gain entry through a protective firewall. In the preferred embodiment, a proprietary log-on code 22 (FIG. 7A) is entered. This log-on code 22 provides access to all information, authorized by the security level of the user, contained in the secure database 12. To focus the inquiry on the information 24 the user inputs information such as address details, chemical identification details, location to obtain weather information, or input of information to be used later for the incident reporting feature (FIG. 6). With this information, the secure database 12 then makes available to emergency response personnel information on the nature of the chemicals reported by the facility on Tier I and Tier II, Form R, Risk Management Plans, or Business Plans (for handling response to an incident), as well as details collected by a pre-plan or pre-fire survey. Once this information has been provided, emergency response personnel are then allowed to drill down further into the database 28 (FIG. 7E) to obtain more specific information about the chemical properties of the specific hazardous materials stored at the site of the emergency. Still further information may be provided by a direct link to additional sources of information on identified chemicals such as has been made available by Cornell University (FIG. 7F). Herein, emergency response personnel may learn about the proper clothing to be worn, the proper equipment needed to contain the hazardous material, and the best method of quickly neutralizing any hazardous effects caused by the release or incineration of the hazardous material. In addition, the user can access information on the likely area of contamination. In the preferred embodiment, this information is obtained by emergency response personnel using a wire-connected or wireless communication device 30. For maximum mobility, a wireless communication device 30 can be used. The wireless communication device 30 includes a screen upon which information from the secure database may be visually displayed for rapid absorption by emergency response personnel.

A further understanding of the system for supplying critical information to emergency response personnel of the present invention 10 may be had by reference to the technical architecture of the system.

Figure 2:
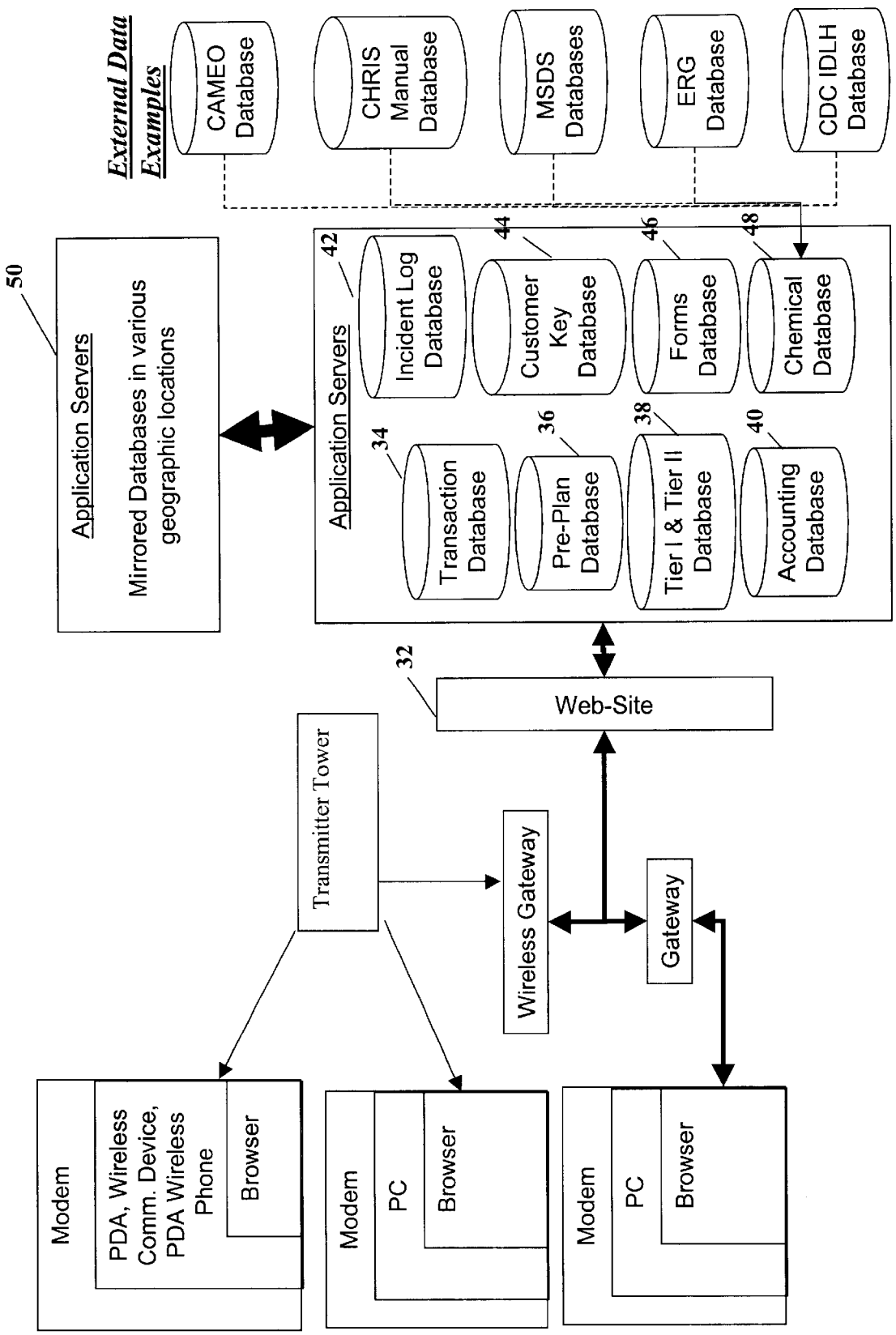
FIG. 2 is a schematic diagram of architecture of the disclosed system.

As shown in FIG. 2, businesses or facilities storing hazardous materials may enter information into the secure database using a personal computer (PC) including a modem and browser by which access to the Internet may be accomplished. By using a series of screen prompts, the business or facility may provide information which identifies itself, information which identifies the hazardous materials stored at the business or facility, and any other information deemed pertinent for emergency response personnel. Other pre-incident information, such as a site-plan of the facility obtained by fire department personnel or other public agency personnel during a walk-through survey, visit or inspection of a factory, a shop, a warehouse, a place of business or facility, may also be placed into the secure database 12. A portal for access to the secure database 12 is typically a dedicated web site 32 which includes sufficient screen prompts for those inputting information to assure that all information is put in in a proper format which can be stored and later accessed. The various servers which manage the secure database 12 include a variety of databases to hold needed information.

As further shown in FIG. 2, such databases include a transaction database 34 for keeping track of the various activities regarding input of data into the secure database 12, queries made on the database, analysis of data in the database, and a pre-plan database 36 in which site-plans of the facility and reported location of hazardous materials are placed into the secure database 12, a Tier I and Tier II database 38 in which information about the hazardous chemicals reported to be at a particular factory, warehouse or shop are placed into the secure database 12, and an accounting database 40 by which information regarding the value of each transaction is placed into the secure database 12. Also contained are databases which record post-incident information 42, information on individual customers 44, information on the necessary forms which need to be submitted to government agencies 46, and information on various chemicals which may be encountered when responding to a situation involving hazardous materials. This database of chemical information 48 may be a compendium of information from other databases which record information about hazardous materials. A sampling of these databases includes the CAMEO database, the Coast Guard's CHRIS Manual database, the Material Safety Data Sheet databases, the Emergency Response Guidebook database, and the Center for Disease Control Immediately Dangerous to Life or Health database.

To assure that all the information in the databases is continually available, a fail-safe data storage system 50 is created in which the data is mirrored on more than one server so that a complete set of data is available to emergency response personnel when needed. Such a data storage system 50 will assure that any hardware difficulties wherein data cannot be accessed on a single server are easily overcome.

As may be seen on the left side of FIG. 2, the information contained within the database 12 can be made available to emergency response personnel using a wireless communication device 30 or an internet connected device, after a call for help or an alarm has been received.

Figure 3:
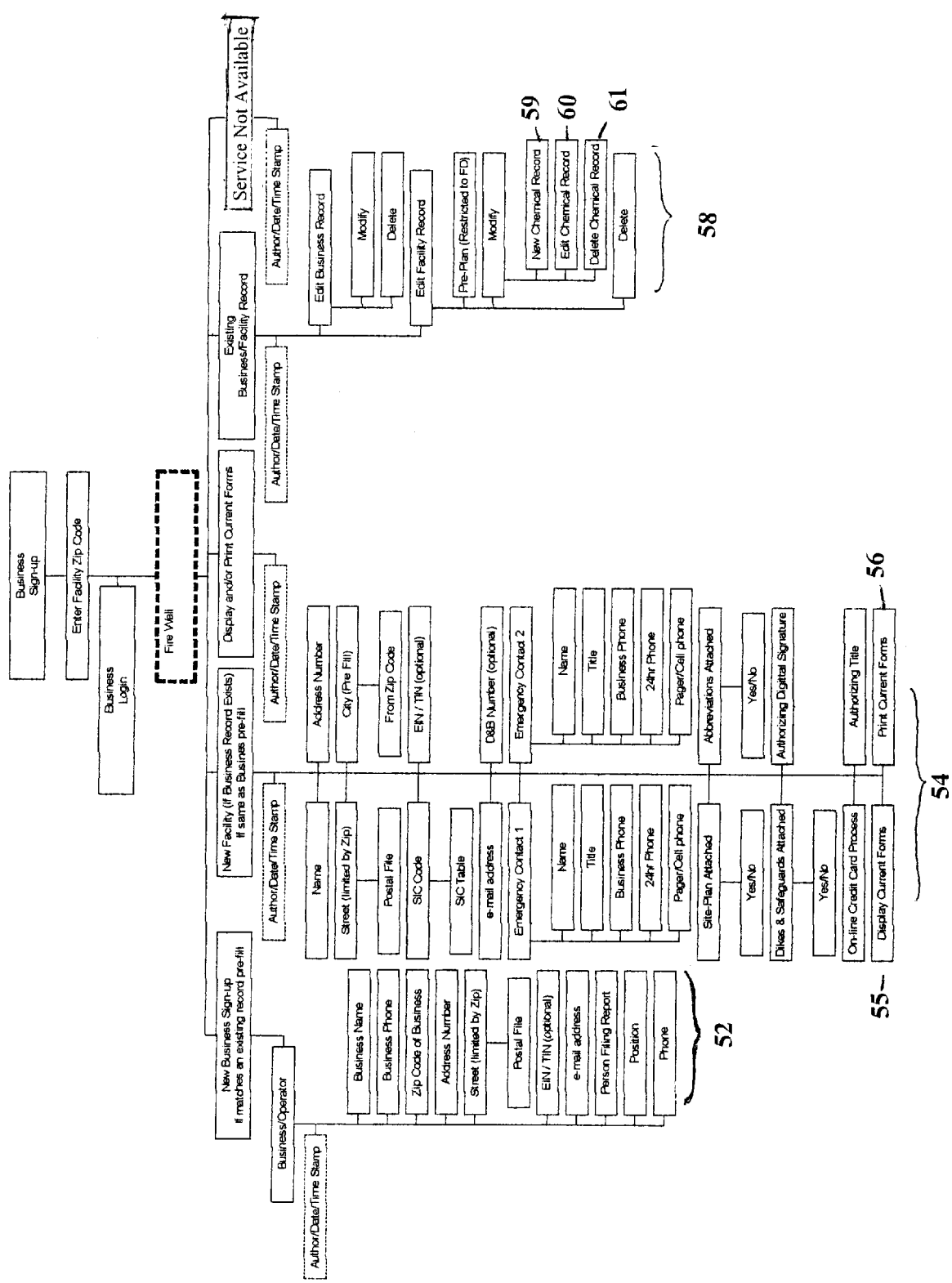
FIG. 3 is a flowchart describing the entry of business and facility identification information into the secure database.

Referring back to FIG. 1, it may be seen that one of the key items of information to be placed into the secure database 12 is information containing the identification of a business or facility 14. The flow for the entry of information regarding the entry of information about a business or facility is shown in FIG. 3. Therein, it may be seen that once the business or facility has signed up and provided basic information 52, a series of prompts are provided requesting additional information 54. The procedure also allows the display 55 and printout 56 of current forms, both locally at the user's location, as well as remotely at the appropriate regulatory agency, planning entity and public agency such as a fire department or law enforcement agency, required for completing a paper record of the presence of hazardous materials. If additions are to be made to the chemical record, another branch 58 of the flow diagram provides the ability to enter 59, edit 60, or delete 61 information on the presence of chemicals.

Figure 4:
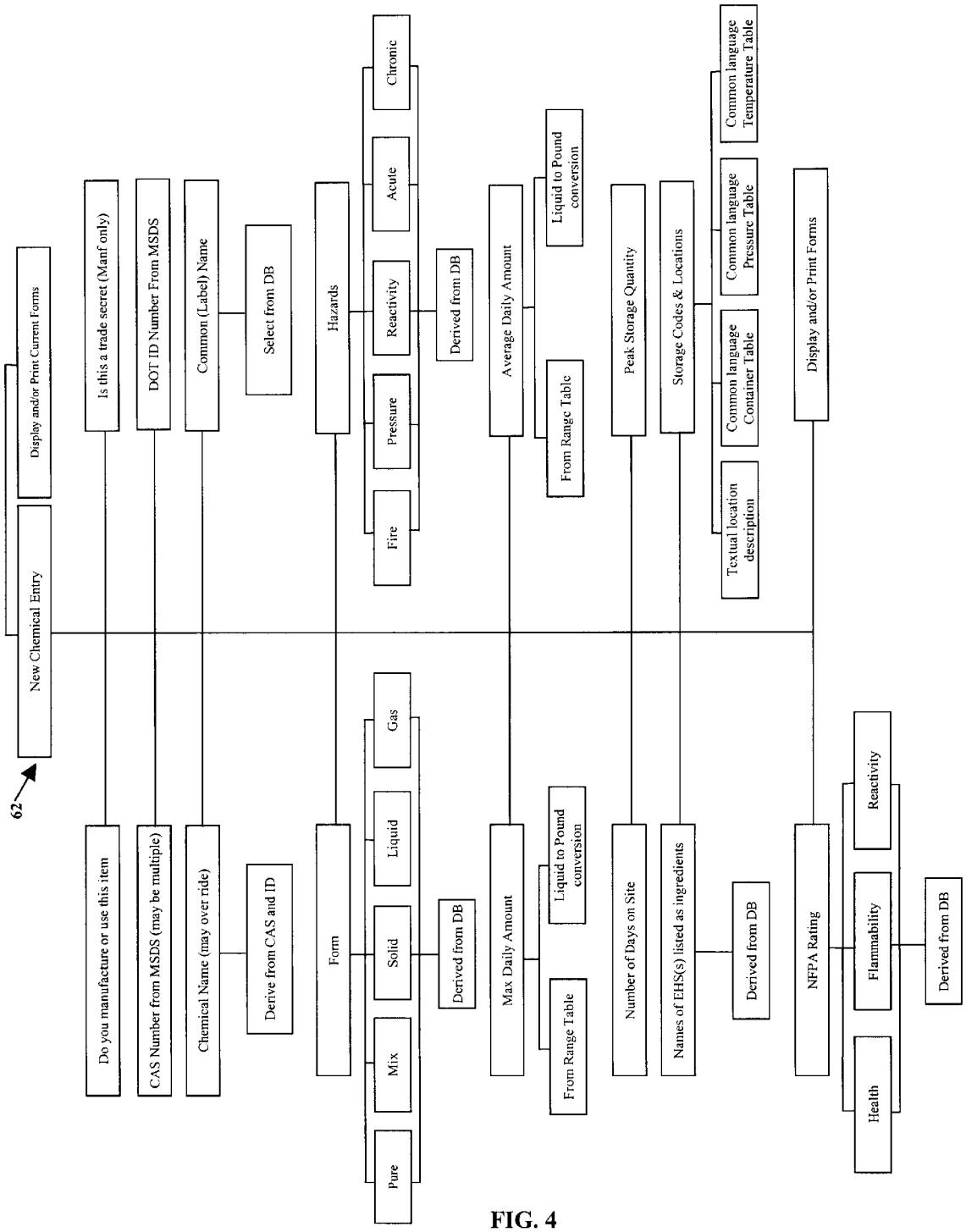
FIG. 4 is a flowchart describing the entry of new hazardous material information into the secure database.

The entry of information concerning a chemical stored at a factory, warehouse or shop is some of the most important information contained in the secure database. A flow chart 62 is shown in FIG. 4 indicating how this information is added into the secure database 12. The information is requested by a series of screen prompts and tracks the information typically requested on standard governmental forms such as a Tier I form, Tier II form, Risk Management Plan, Business Plan (for the purpose of responding to an incident), or a Form R where this information is to be recorded and sent to the appropriate governmental agencies.

As may be seen in FIG. 4, the program provides various prompts and pathways to assure that all needed items about hazardous materials stored at a factory, warehouse, shop, or any other type of business location are entered in the system.

The pre-plan or pre-incident survey information is an essential part of the information contained in the secure database. Many communities and public agencies conduct pre-incident surveys, visits or inspections during which maps are created of a factory, warehouse or shop indicating where hazardous materials are stored. In addition, these maps may contain a variety of other important information, all of which has significant utilization to emergency response personnel at the time of an emergency. There is wide variation in the quality of these pre-incident surveys or pre-incident plans or pre-plans depending on the effectiveness of the government personnel who visit businesses and their ability to determine the location of information and describe it for use by others.

Figure 5:
FIG. 5 is a flowchart describing the entry of facility specific location information.

As may be seen in FIG. 5, the flow chart for the entry of pre-plan information 64 includes a variety of significant information that is of great utilization to emergency response personnel. For example, the information entered into the secure database 12 includes information about the business and facility itself 66, the utilities connected to the business or facility 68, the type of construction of the building 70, the emergency equipment 22 available within the building to include the sprinkler systems 73, the standpipe systems 74, and the fire hydrants 75. Other information of importance to emergency response personnel includes information on the mechanical services 76 contained within the building and the location of stairwells. Still further information includes information on primary 77 and secondary 78 personnel contacts, and information with regard to the rescue of the occupants 79 of the building. Finally, as previously indicated, one of the most important aspects of the pre-plan is the graphic layout 80 or design, floor plan design, or site-plan that includes, in addition to other data, information regarding the storage site of the hazardous materials. In the preferred embodiment, the disclosed system provides the user with various graphic images such as maps, blueprints, or aerial photographs, satellite photographs of the site itself or nearby geographic features. Such graphic images may be drawn from one or more outside sources to aid the user in creating a more accurate and usable site-plan.

Figure 1:
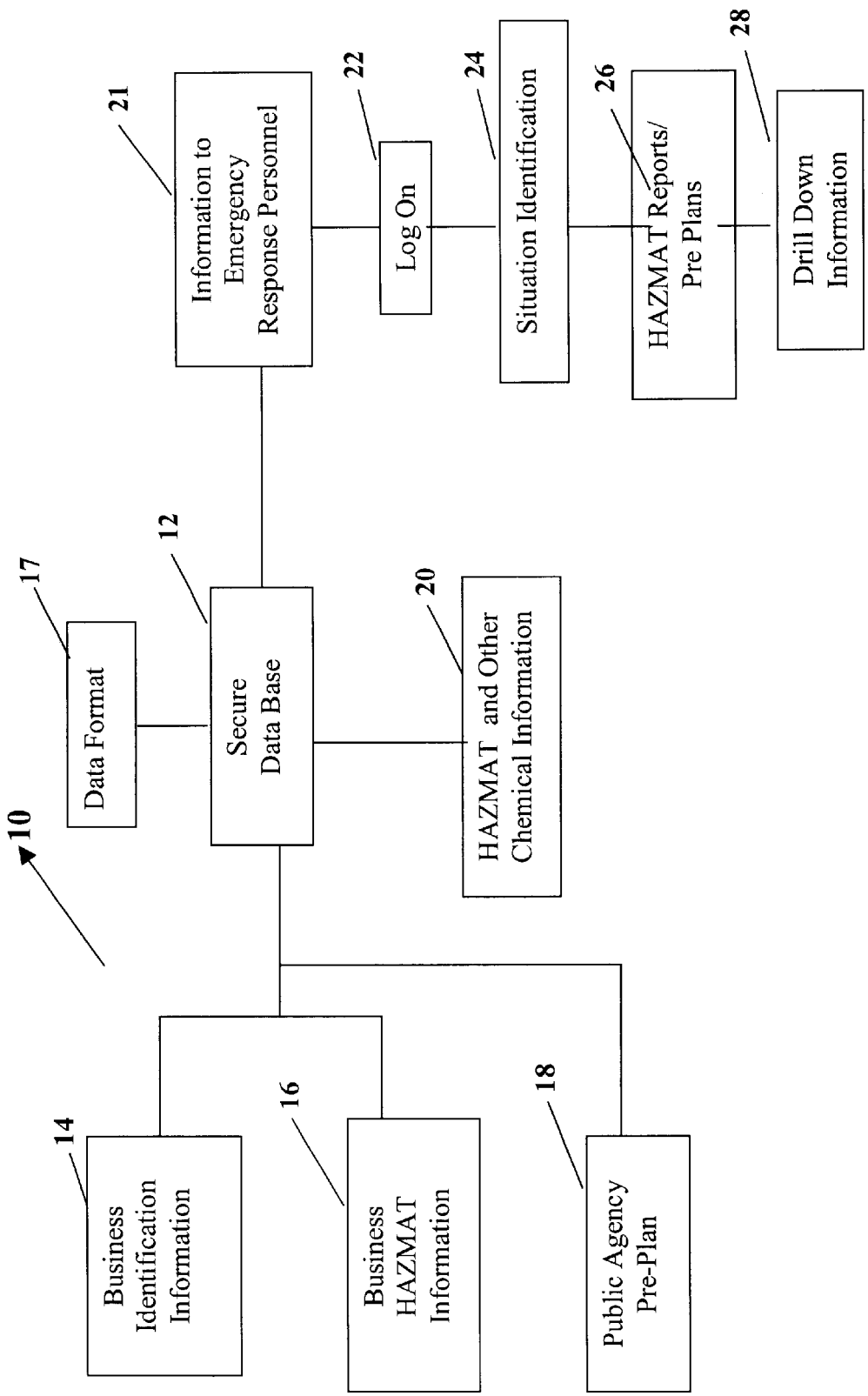
FIG. 1 is schematic diagram of the organization of the disclosed system.

As may still be seen further in FIG. 1, the secure database 12 also includes publicly available information on how to respond to a spill or a fire involving hazardous chemicals. Such information may include whether or not the information provides a hazard to health, and what type of clothing must be worn to reduce any health hazards. Such information may also include reactivity of the hazardous material with other chemicals and any fire hazards associated with the hazardous material. Still further information may include information as to whether or not the hazardous material will pollute water or air supplies. If further chemical information such as its density, thermoconductivity, viscosity or solubility is required, such information may also be made available.

As shown in FIG. 2 one source of such information is the Coast Guard's CHRIS Lookup database. Another publicly available source of information is the CAMEO Lookup database for information on hazardous materials. Still another source of information is the DOT Emergency Response Guidebook which provides a lookup feature and a variety of information that is very useful to emergency response personnel. Still further information which may be contained in the secure database 12 is information obtained from the Center for Disease Control System for Immediate Danger to Life and Health. This information provides emergency response personnel with a warning concerning primarily biological information associated with hazardous materials and, finally, the material safety data sheets are made available through the secure database and can be rapidly pulled up by emergency response personnel if needed.

The real value of the system to emergency response personnel comes after receipt of a call for help or an alarm is sounded. At this time, the emergency response personnel must get ready to respond to the emergency and learn as much information as possible between the receipt of the call for help and their arrival at the site of the emergency. The processing of requesting and receiving information may begin at a stationary computer located at the firehouse or a dispatch operation, connected to the secure database 12 through telephone lines or other modem connection. In this early period, just after the receipt of an alarm or call for help, sufficient information may be gathered to assure that emergency response personnel wear the proper protective equipment and place the necessary apparatus on the vehicle to be driven to the site of the emergency. Once the vehicle departs the firehouse, a wireless communications device 30 may be used to gather yet additional information about the nature and the reported location of the materials to be encountered at the site of the emergency. If multiple groups of emergency response personnel are dispatched to the site of the emergency, all can receive information while enroute to the site of the emergency.

If needed, current weather may also be provided to emergency response personnel as shown in FIG. 7C.

An exemplary wireless communication device 30 which may be used to provide information to emergency response personnel may be seen in FIGS. 7A–F. In the first Figure, FIG. 7A, the emergency response personnel utilizing the device 30 are asked for a particular password. Once the password is entered, the system then requests the address of where the emergency is located and the type of incident being responded to as shown in FIG. 7B. With this information, the system immediately produces information contained in the Tier I reports, Tier II reports, Risk Management Plans and Business Plans on the type of the reported chemicals located at the factory, warehouse or shop where the incident is reported to be occurring; as shown in FIG. 7C.

Figure 7E:
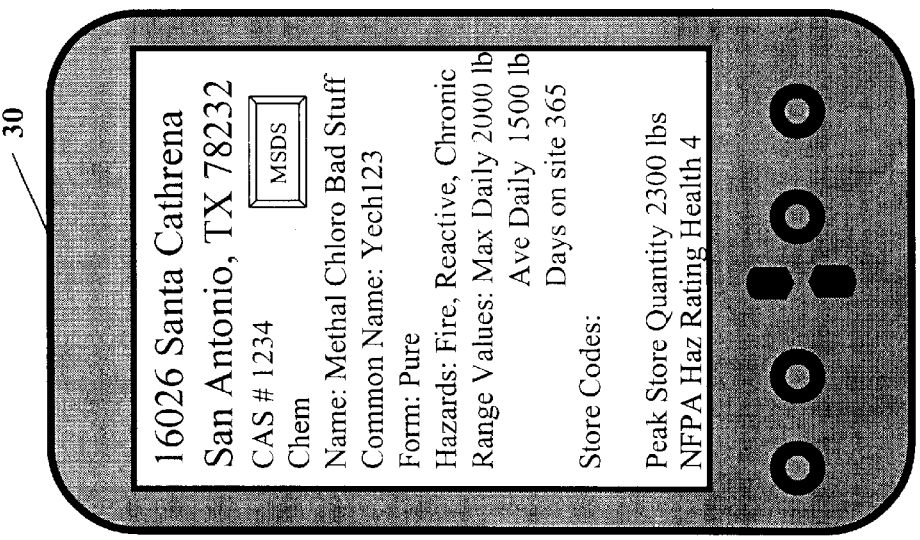
Figure 7D:
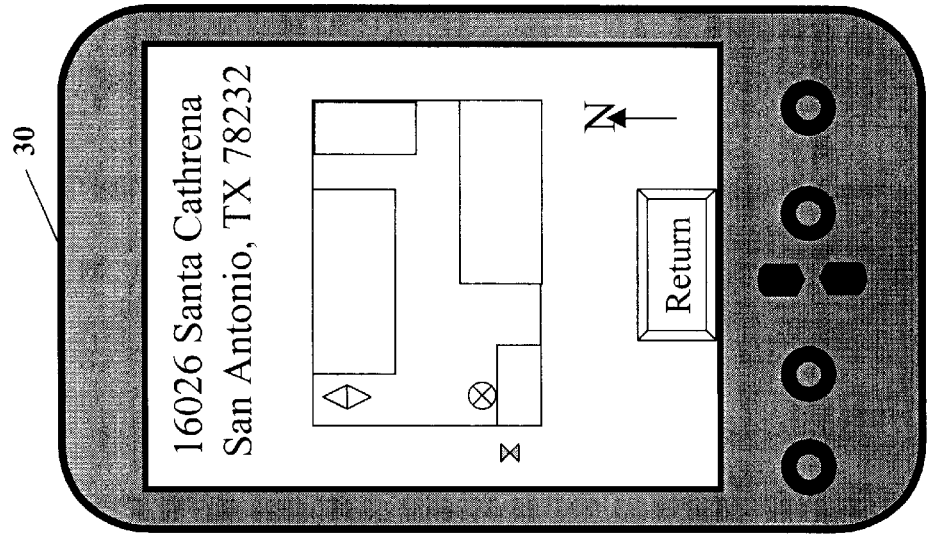

If a pre-plan is on file, this pre-plan is made available on the screen of the wireless communication device as shown in FIG. 7D or a similar depiction of the information may be presented on a computer connected to the world-wide internet. Those of ordinary skill in the art will understand that while a wireless communication device is shown in the preferred embodiment, other types of communication devices may be used without departing from the scope of the invention. By quickly looking at the pre-plan, the user is able to rapidly determine where in the factory, warehouse, shop, place of business or facility specific structural or other features are and the reported location of any hazardous material. If further information about the hazardous material is required, then the system allows the user to drill down further to obtain more detailed information about the hazardous material as shown in FIG. 7E. If yet still further information is needed, the system provides a direct link to publicly available web sites, having still further information regarding hazardous materials. One such web site is the one which includes the material data safety sheets located at a web site sponsored by Cornell University as shown in FIG. 7F.

Because the information contained in the secure database 12 is very similar to the information required in government reports, the information contained in the secure database may be formatted in such a way such that required government reports such as Tier I, Tier II reports, or a Form R report may be completed utilizing the information contained in the secure database and then transmitted electronically to a state regulatory or watchdog agency such as a department of health, a state or local emergency planning committee (LEPC), or any other type of agency which monitors the presence of hazardous materials within a community as shown in FIG. 8.

As shown in FIG. 9, the information contained in the secure database 12 is also particularly valuable when combined with post-incident information. Either during or following an incident, as previously described, emergency response personnel may add information regarding the incident to the secure database 12. This post-incident information, combined with the pre-incident information, may then be used to file post-incident reports 13 which are often required by government personnel.

The system of the present invention enables the gathering of information typically used by emergency response personnel. This collection of information may also be extremely valuable to city planners, real estate developers, insurance companies, and risk management professionals. Specifically, the collection of information can be used to facilitate planning, analysis and decision making with regard to the effective use of resources for risk avoidance and risk management utilizing data warehousing and data mining software to sort and organize the collection of information in the secure database 12 of the present invention.

Those of ordinary skill in the art will also understand that the system of the present invention may contain other information than just information on hazardous materials. For example, the system of the present invention may be expanded to utilization with residences having living areas if information about the people living in a residence is substituted for the information on hazardous materials described above. Specifically, if a living area is designed for occupancy by a child, then this living area may be so specified in a pre-plan, which is located in the secure database 12. Similarly, if an infirm or an elderly person lives in a particular area of a residence, or for that matter, a nursing home, medical facility such as hospital, clinic or dispensary or an elder care facility, this information may also be placed into a pre-plan 18 which can be loaded into the secure database 12 for later access by emergency response personnel 21. In more rural areas, where either pets or commercial livestock are kept, the location of pets or commercial livestock may also be included in the secure database so that when emergency response personnel arrive at the scene of the emergency, their effectiveness at rescuing people or animals and minimizing danger may be vastly increased.

The system of the present invention 10 includes the collection, management and distribution of the information needed by emergency response personnel in a format and over a communication system which makes this information easily obtained and quickly absorbed by emergency response personnel. The system includes the software and hardware that is used for inputting information into the secure database, the software and hardware by which the information is stored in the secure database, and the software or hardware of the communication device by which the information is extracted from the secure database. The system also includes the various communication links between the methods for inputting information into the secure database and for transmitting information from the secure database, to emergency response personnel.

The method of the present invention includes the various steps by which information is placed into the secure database and the steps by which the information is extracted from the secure database, the various steps by which the information is analyzed using data mining and data analysis techniques and data warehousing techniques and the steps by which it is most easily conveyed to an absorbed by emergency response personnel.

The apparatus associated with the present invention is the communication device by which the information contained in the secure database is made available to emergency response personnel. Methods for extracting information from the secure database may include manual keystroke input, voice recognition software, or any other similar method known to those of ordinary skill in the art. Such apparatus must include the means for communication with the secure database so that complete information may be rapidly transmitted to emergency response personnel for enabling proper preparation for response to the emergency, outfitting with the proper equipment needed to either contain hazardous materials, neutralize hazardous materials or provide appropriate rescue and then instructions on how to properly act when on the scene of the emergency.

While the present system method and apparatus have been described in terms of their preferred and alternate embodiments, those of ordinary skill in the art will understand that other embodiments of the present invention are enabled by reference to the foregoing disclosure. Such other embodiments shall be included within the scope and meaning of the appended claims.

I claim:

1. An apparatus for dynamically collecting data regarding emergency information, said apparatus comprising:
   first means for collecting said data during regulatory mandated reporting campaigns, including reporting of hazardous materials used or stored on site and their location, to make information available to emergency response personnel in the event of an incident,
      said first means formatting, printing, and presenting documents related to said regulatory mandated reporting campaigns for distribution to a plurality of regulatory mandated public agencies using a plurality of telecommunication channels,
      said first means providing for real-time access to input and update said data by entities reporting said data via a plurality of telecommunications channels;
   second means for receiving said data during regular inspection, including site plans, pre-plans, facility emergency response plans, equipment locations, space utilization and to make information available to emergency response personnel in the event of an incident,
      said second means formatting, printing and presenting documents for distribution to a plurality of public safety and government entities, using a plurality of telecommunication channels,
      said second means providing for real-time access to input and update said data by inspection entities reporting said data via a plurality of telecommunications channels,
   third means for collecting said data volunteered by businesses, agencies and individuals desiring to make information available to emergency response personnel for use in the event of an accident, including information on infirm, elderly persons, children, pets and domestic animals, site plans, pre-plans, facility emergency response plans, equipment locations, space utilization, hazardous conditions and hazardous materials,
      said third means permitting businesses, agencies, and private individuals to provide said data in a plurality or protected or secure fashions for use in an emergency by said emergency response personnel on scene or en route to an incident or reported incident, and for use in an emergency planning event by said emergency planning personnel,
      said third means permitting said emergency response personnel to access said data over secure channels,
      said third means providing for real-time access to said data by said emergency response personnel via a plurality of telecommunications channels,
   fourth means for collecting data from non-related systems to present to an emergency response personnel user, to enhance their understanding of an incident or reported incident,
      said fourth means including hazardous materials reference documents, photographs, maps and current and forecast weather,
   fifth means having the ability to analyze and discover correlations or trends associated with said data that would permit proactive responses by said emergency planning personnel and emergency or first responder personnel,
   said data, regarding emergency information, being stored so as to be made available real-time to approved emergency responders and to approved planning personnel when requested, remote from said first means, said second means, said third means, said fourth means, and said fifth means,
   said data, regarding emergency information, including maps, site photographs and depiction of stored data on said maps and said photographs,
   said data, regarding emergency information, being stored in a secure data repository,
   said data, regarding emergency information, being housed in a centralized single system available to a plurality of public safety and government entities.

2. An apparatus for dynamically transmitting data regarding emergency information, said apparatus further comprising:
   said data, regarding emergency information, including information on infirm, or elderly persons, children, pets, domestic animals, site plans, pre-plans, facility emergency response plans, equipment locations, space utilization, hazardous conditions and hazardous materials, depiction of stored data on maps and photographs, being made available to approved emergency responders, upon request, remote from the data repository and said first means, said second means, said third means, said fourth means and said fifth means detailed in claim 1, said data, regarding emergency information collected from non-related systems, including maps, site photographs, hazardous materials reference documents, current and forecast weather, being made available to approved emergency responders, upon request, remote from the data repository, and said first means, said second means, said third means, said fourth means and said fifth means detailed in claim 1, said data, regarding emergency information, being provided in human language terms, said data, regarding emergency information, being housed in a centralized system available to a plurality of public safety and government entities remote from the data repository, said data, regarding emergency information, being made available to said emergency personnel across disparate jurisdictions and across a plurality of disparate professions including firefighters, law enforcement personnel, emergency medical technicians, emergency managers and other first response personnel via secure or controlled access via a plurality of telecommunications channels, said data, being made available to approved emergency response personnel on-scene or en-route to an incident or reported incident, said data, being made available to approved planning personnel to analyze and discover correlations or trends associated with said data that would permit proactive responses to an incident or reported incident.

\* \* \* \* \*